June 22, 1937.  C. H. BLACK  2,084,888

PROTECTIVE ARRANGEMENT

Filed Jan. 31, 1936  2 Sheets-Sheet 1

Inventor:
Cadelle H. Black,
by Harry E. Dunham
His Attorney.

Inventor:
Cadelle H. Black,
by Harry E. Dunham
His Attorney.

Patented June 22, 1937

2,084,888

UNITED STATES PATENT OFFICE 2,084,888

PROTECTIVE ARRANGEMENT

Cadelle H. Black, Drexel Hill, Pa., assignor to General Electric Company, a corporation of New York Application January 31, 1936, Serial No. 61,657

7 Claims. (Cl. 175—294)

My invention relates to improvements in protective arrangements for electric systems and more particularly to improvements in protective arrangements for alternating current network distribution systems. One object of my invention is to provide an improved protective arrangement whereby to afford protection in case of failure of the usual protective means. This and other objects of my invention will appear in more detail hereinafter.

In alternating current network distribution systems, it is customary to provide network protectors which include a circuit breaker for disconnecting the network from the feeder in case of a fault on the feeder but not when a fault occurs in the network. Because of the required discriminating features, the protector is a relatively complicated and expensive device. Consequently, there is the possibility that the circuit breaker may fail to disconnect the network as intended and possibly be destroyed itself by heavy fault currents. To prevent the damage attendant to the system on failure of the circuit breaker to open, fuses have been connected in series in the network circuit as back-up protective devices. Since a fuse is a current operated device, it does not discriminate between feeder faults and network faults. Also, as the currents may in either case be large enough to rupture the fuse, the network may be disconnected from the feeder on network faults and the discriminating features provided in the network protector at considerable expense are thus lost. In other words, the continuity of supply may be interrupted and the practice of letting the network fault burn off be upset. If the fuse is given a high enough rating to prevent operation from network faults, then it will not operate properly on feeder faults because the degree of sensitivity required for feeder fault operation is relatively high.

In accordance with my invention, I provide an improved protective arrangement for so controlling the fuse as to render it more liable to rupture on feeder faults than on network faults. Further in accordance with my invention, I may control the rupturing of the fuses by the same fault protecting apparatus as is used to control the circuit breaker or the network protector.

My invention will be better understood from the following description when considered in connection with the accompanying two sheets of drawings, and its scope will be pointed out in the appended claims.

Figure 1:
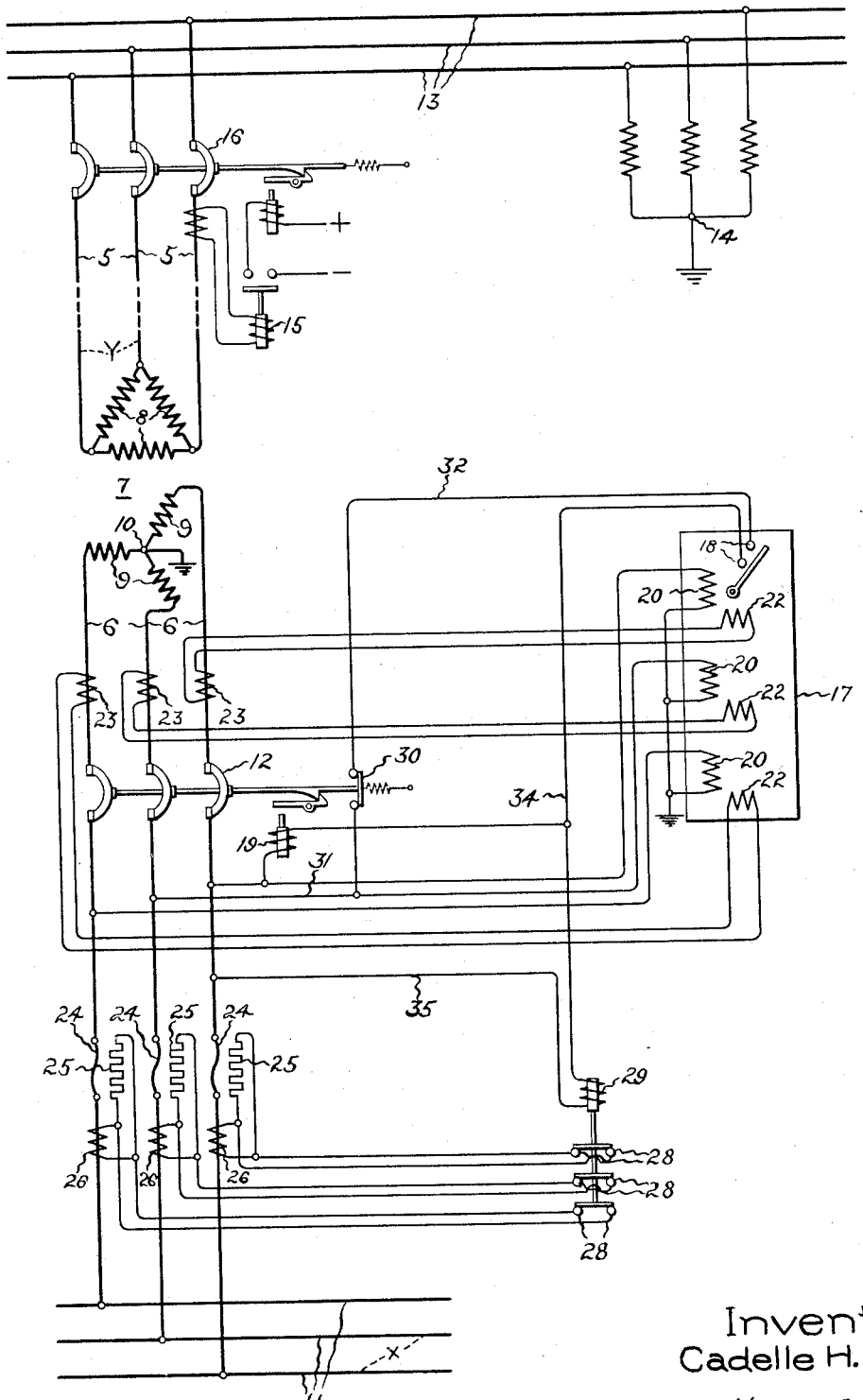
Figure 2:
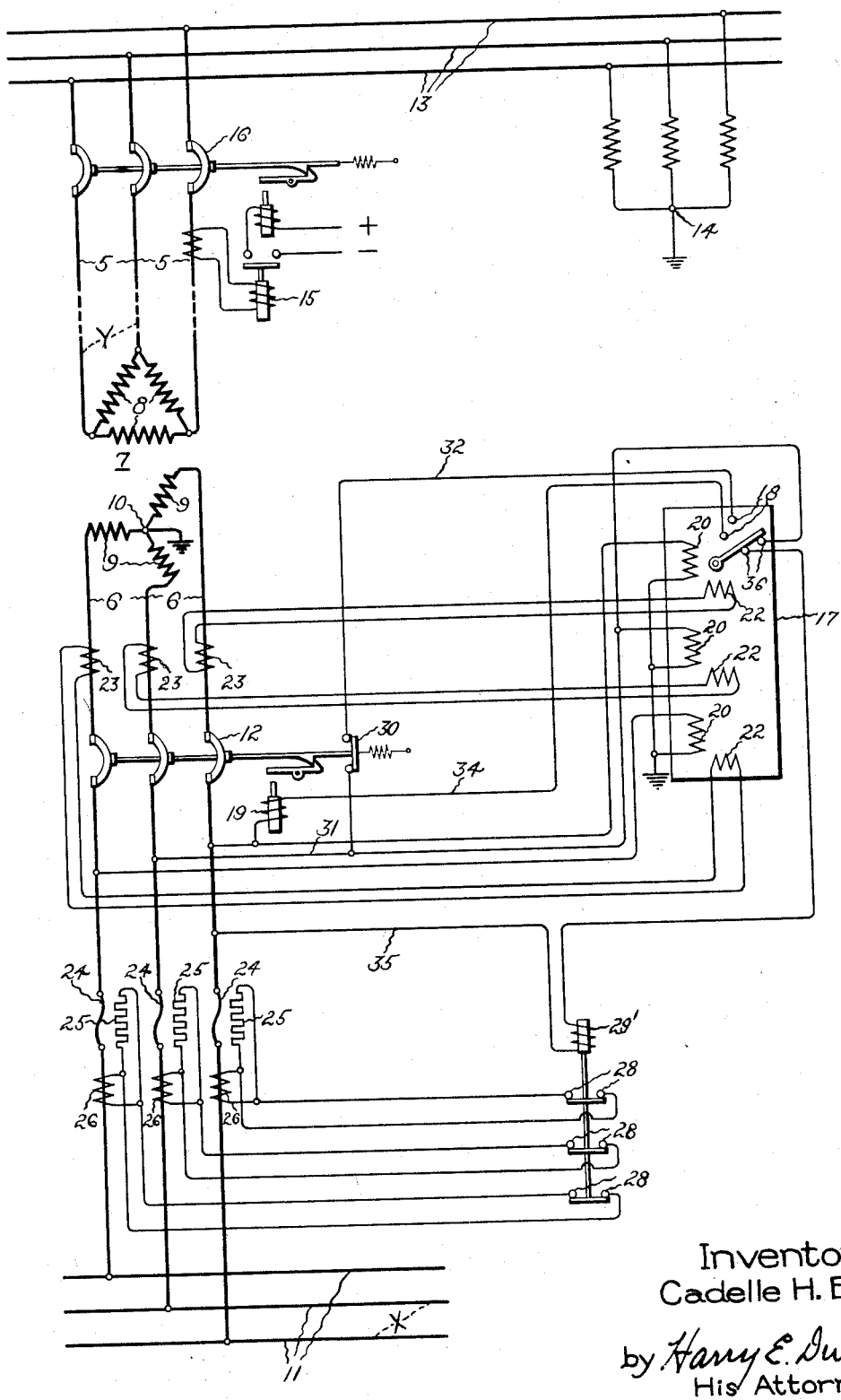

In the accompanying drawings, Fig. 1 illustrates diagrammatically a protective arrangement embodying my invention, and Fig. 2 illustrates diagrammatically a modification of the embodiment of my invention shown in Fig. 1.

In Fig. 1, I have shown, for the purpose of illustrating my invention, an embodiment thereof as applied to the protection of an electric system comprising two electric circuits 5 and 6. As illustrated, these are three-phase circuits which are inductively coupled by a transformer 7 having windings 8 delta-connected to the circuit 5 and windings 9 star-connected to the circuit 6 with the neutral point 10 grounded. The circuit 5 may represent one of a plurality of feeder circuits which are arranged to supply the network indicated schematically by conductors 11. The respective feeders network is connected to the respective feeders through suitable circuit interrupting means, such as a latch-closed circuit breaker 12. The feeders extend from one or more power stations 13 which are usually provided with a grounded neutral 14. Each feeder is provided with fault-responsive protective means, such for example as overcurrent relays 15, only one being shown for simplicity, and suitable circuit interrupting means 16 for opening the feeder at the power station on the occurrence of abnormal conditions on the feeder.

For controlling the circuit breaker 12 so as to effect the opening thereof when energy flow is from the network to the feeder, there may be provided energy directional responsive means, such as the polyphase energy directional relay 17, which is arranged through its contacts 18 to effect the energization of the trip coil 19 of the circuit breaker 12 on the occurrence of energy flow from the network to the feeder. The relay 17 comprises voltage windings 20 which may be connected to be energized from the network side of the circuit breaker 12 and co-operating current windings 22 which, as shown, are connected to be energized from current transformers 23 on the feeder side of the circuit breaker 12.

In order to provide back-up protection in case of failure of the circuit breaker 12 to open under the control of the energy directional relay 17, I provide suitable means, such as fuses 24, in series with the phase conductors 6. These fuses have a predetermined current rating such that they will not rupture with fault currents of the magnitude to be expected on the network. But further in accordance with my invention, I provide means for effecting the rupture of the fuses 24 at a lower current value when the circuit breaker 12 fails to open while the flow of energy is in a predetermined direction, for example, from the network to the feeder. For this purpose, I may provide means which, in effect, accelerate the melting of the fuses, as for example, resistance heaters 25. These may be connected to be energized from current transformers 26 in the phase conductors 6. These resistances may normally be rendered ineffective by short-circuiting them through suitable switching means, such for example, as the contacts 28 of an auxiliary relay 29.

This relay is under the control of the energy directional relay 17 through its trip contacts 18 and also under the control of the circuit breaker 12 through suitable means such as an auxiliary switch 30, which is closed when the circuit breaker is closed. Thus, for example, the auxiliary relay 29 may have its energizing circuit controlled through the trip contacts 18 of the relay 17 and the circuit breaker auxiliary switch 30 in series. Then if the relay 17 indicates a fault on the feeder 5 and the circuit breaker 12 fails to open, the auxiliary relay 29 is energized, thereby removing the short-circuit from the heating resistance. This in effect insures the rupture of the fuses 24 at a current less than their straight fuse current rating, whereby to insure disconnection of the feeder from the network.

Assuming the parts positioned as shown in the drawings, then in case of a fault on the network, as at X, the relay 17 will not close its trip contacts 18 because energy flow is from the feeder to the network. The fuses 24 will not operate to open the circuit because their rating is higher than currents to be expected in case of network faults. If, however, there is a fault on the feeder, as at Y, then the energy directional relay 17 will close its trip contacts 18 to complete the circuit of the trip coil 19. This circuit may be traced from the middle phase conductor 6, through the conductor 31, the auxiliary switch 30, the conductor 32, the relay trip contacts 18, the conductor 34, and the trip coil 19, to the right-hand phase conductor 6. Ordinarily, the circuit breaker 12 will be tripped to open. But if it fails to open because the mechanism has stuck or the contacts are welded together, then the auxiliary switch 30 remains closed. Consequently the circuit of the auxiliary relay 29 is completed as follows: From the middle phase conductor 6 through the conductor 31, the auxiliary switch 30, the conductor 32, the relay trip contacts 18, conductor 34, the winding of the auxiliary relay 29, and the conductor 35 to the right-hand phase conductor 6. Upon energization, the auxiliary relay 29 opens its contacts 28 to remove the short-circuit from the resistance 25. The secondary heating effect of the resistors added to the primary heating effect of the main phase current in the fuses themselves results in the disconnection of the network from the feeder even though the circuit breaker remains closed and the primary feeder current is not of a value sufficient by itself to melt the fuses.

The circuit of the auxiliary relay 29 does not necessarily have to include the circuit breaker auxiliary switch 30, although it is preferable where the usual type of directional relay with holding contacts is used. This will be obvious to those skilled in the art since the relay 29 has to pick up for low voltages and would not ordinarily be designed to withstand for any length of time full circuit voltage which it would have impressed thereon in case the auxiliary switch 30 were omitted. The auxiliary switch 30 also relieves the power directional relay contacts 18 from the opening duty of the auxiliary relay circuit.

Where there is a possibility that a circuit breaker may open mechanically but not electrically, for example, in case of breakdown of insulation or arcover, the auxiliary switch 30 should be omitted or the embodiment of my invention shown in Fig. 2 may be used. In this arrangement, the auxiliary relay 29' is circuit closing and is arranged to be energized to short-circuit the current transformers 26 when power flow is in the normal direction; that is, from the feeder to the network. For this purpose, the circuit of the auxiliary relay may be controlled through the normally closed contacts 36 of the power directional relay 17. Thus, normally the current transformers 26 are short-circuited but in case of a reversal of power flow, the contacts 36 are opened to effect the de-energization of the auxiliary relay 29'. Consequently, if the circuit breaker 12 fails to open the circuit electrically, the rupturing of the fuses 24 will be accelerated by the additional heating so as to effect the desired circuit interruption.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States is:

1. In combination, two electric circuits, means connecting said circuits for exchange of energy, a circuit breaker for interrupting one of said circuits, means responsive to the direction of energy exchange between said circuits for controlling said circuit breaker to effect the opening thereof when the flow of energy is in a predetermined direction, back-up circuit interrupting means in said one of said circuits including a series-connected fuse having a predetermined current rating, and means controlled by said energy directional responsive means and said circuit breaker for effecting the rupture of said fuse when said circuit breaker fails to open while the flow of energy is in said predetermined direction and the current in said one circuit is less than said predetermined current rating.

2. In combination, an electric circuit, a circuit breaker for interrupting said circuit, means responsive to the direction of energy flow in said circuit for controlling said circuit breaker to effect the opening thereof when the flow of energy is in a predetermined direction, a fuse in said circuit having a predetermined current rating, and means controlled by said energy directional responsive means and said circuit breaker for effecting the rupture of said fuse when said circuit breaker fails to open while the flow of energy is in said predetermined direction and the current is less than said predetermined current rating.

3. In combination, an electric circuit, a circuit breaker for interrupting said circuit, means for controlling said circuit breaker to effect the opening thereof when the flow of energy in the circuit is in a predetermined direction, a fuse in said circuit having a predetermined current rating, and means for effecting the rupture of said fuse when said circuit breaker fails to open while the flow of energy is in said predetermined direction and the current is less than said predetermined current rating.

4. In combination, an electric circuit, a circuit breaker for interrupting said circuit, means for controlling said circuit breaker to effect the opening thereof under predetermined circuit conditions, a fuse in said circuit having a predetermined current rating, and means for effecting the rupture of said fuse when said circuit breaker fails to open while said predetermined circuit conditions prevail and the circuit current is less than said predetermined current rating.

5. In combination, a feeder circuit, a network circuit, means for inductively coupling said circuits, a circuit breaker in said network circuit, means responsive to the direction of energy exchange between said circuits for controlling said circuit breaker to effect the opening thereof on flow of energy from the network circuit to the feeder circuit, back-up circuit interrupting means in said feeder circuit including a series-connected fuse having a current rating in excess of the greatest current expected during a fault on the network circuit, and means controlled by said energy directional responsive means and said circuit breaker for effecting the rupture of said fuse at a lower current value when said circuit breaker fails to open on the occurrence of a fault on the feeder circuit.

6. In combination, an electric circuit, a circuit breaker for interrupting said circuit, means for controlling said circuit breaker to effect the opening thereof under predetermined circuit conditions, a fuse in said circuit having a predetermined current rating, and means for effecting the rupture of said fuse when said predetermined conditions prevail and the circuit current is less than said predetermined current rating.

7. In combination, an electric circuit, a circuit breaker for interrupting said circuit, means responsive to the direction of energy flow in said circuit for controlling said circuit breaker to effect the opening thereof when the flow of energy is in a predetermined direction, a fuse in said circuit having a predetermined current rating, and means controlled by said energy directional responsive means for effecting the rupture of said fuse when the flow of energy is in said predetermined direction and the current is less than said predetermined current rating.

CADELLE H. BLACK.